United States Patent
Chen et al.

(10) Patent No.: US 7,928,680 B2
(45) Date of Patent: Apr. 19, 2011

(54) FAN SYSTEM AND STARTING METHOD THEREOF

(75) Inventors: Chien-Hua Chen, Taoyuan Hsien (TW); Chia-Pin Wei, Taoyuan Hsien (TW); Wei-Shuo Tseng, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 347 days.

(21) Appl. No.: 11/976,424

(22) Filed: Oct. 24, 2007

(65) Prior Publication Data

US 2008/0131101 A1    Jun. 5, 2008

(30) Foreign Application Priority Data

Dec. 1, 2006  (TW) ................................ 95144574 A

(51) Int. Cl.
*H02P 7/00* (2006.01)
(52) U.S. Cl. ......... 318/484; 318/445; 388/825; 388/829
(58) Field of Classification Search .................. 318/484, 318/445, 829, 825
See application file for complete search history.

(56) References Cited

U.S. PATENT DOCUMENTS

| | | | | | |
|---|---|---|---|---|---|
| 5,397,970 | A | * | 3/1995 | Rowlette et al. | 318/400.09 |
| 5,962,933 | A | * | 10/1999 | Henderson et al. | 307/126 |
| 6,368,064 | B1 | * | 4/2002 | Bendikas et al. | 417/2 |
| 6,592,327 | B2 | * | 7/2003 | Chen et al. | 415/213.1 |
| 6,815,101 | B2 | * | 11/2004 | de Vaal et al. | 429/13 |
| 6,932,696 | B2 | * | 8/2005 | Schwartz et al. | 454/184 |
| 7,142,125 | B2 | * | 11/2006 | Larson et al. | 340/635 |

\* cited by examiner

*Primary Examiner* — Walter Benson
*Assistant Examiner* — David S Luo
(74) *Attorney, Agent, or Firm* — Birch, Stewart, Kolasch & Birch, LLP

(57) ABSTRACT

A fan system includes a connecting device, a controlling device and a fan device. The connecting device has a plurality of pins receiving at least one driving signal and a start signal. The control device is electrically connected to the pins of the connecting device and has a start control unit. The start control unit generates a first enabling signal in accordance with the start signal. The control device synchronously outputs the first enabling signal and the driving signal. The fan device is electrically connected to the control device and has a plurality of fans. The fan device synchronously transmits the driving signal to the fans and synchronously drives the fans to rotate in accordance with the first enabling signal.

18 Claims, 8 Drawing Sheets

FAN SYSTEM AND STARTING METHOD THEREOF

CROSS REFERENCE TO RELATED APPLICATIONS

This Non-provisional application claims priority under 35 U.S.C. §119(a) on Patent Application No(s). 095144574 filed in Taiwan, Republic of China on Dec. 1, 2006, the entire contents of which are hereby incorporated by reference.

BACKGROUND OF THE INVENTION

1. Field of Invention

The invention relates to a fan system and a starting method thereof and, in particular, relates to a fan system and a starting method thereof capable of starting fans synchronously or in sequence.

2. Related Art

With the high development of the technology, the requirements on the functions of an electronic apparatus are getting higher and higher, the number of the used electronic elements and the degree of integration are getting higher and higher, and the need to dissipate heat is increased. Therefore, the heat dissipating function directly influences the reliability and the lifetime of the electronic apparatus.

A fan is frequently used to serve as a heat-dissipating device, and the number of fans is usually increased or decreased according to different requirements of the corresponding clients. In addition, the rotating speed of each fan in the fan system is controlled and driven by a controlling device or a controlling chip so that the rotating speed of the fan may be adjusted according to the actual operating conditions of the customer system.

As shown in FIG. 1, a conventional fan system is electrically connected to a customer system end $SB_1$. The fan system includes a hot-swap controlling device 11, a controlling device 12 and a fan device 13. Usually, the customer system end $SB_1$ provides main power $MP_1$, sub-power $SP_1$, and a connector $C_1$ for transmitting a first driving signal S01 generated by the main power $MP_1$ and a second driving signal S02 generated by the sub-power $SP_1$ to the fan system.

The hot-swap controlling device 11 has a plurality of hot-swap elements 111 and 112 electrically connected with each other, and a plurality of pins 113. The hot-swap elements 111 and 112 are electrically connected to the customer system end $SB_1$, the controlling device 12 and the fan device 13, and receive the first driving signal S01 and the second driving signal S02, respectively.

The controlling device 12 is a digital signal processor or a microprocessor, and the hot-swap element 112 transmits the second driving signal S02 to start the controlling device 12.

The fan device 13 is electrically connected to the controlling device 12, and has a plurality of fans 131 and a plurality of isolating circuits 132. The hot-swap elements 111 transmit the first driving signals S01 to start the fans 131, respectively, while the isolating circuits 132 are electrically connected to and between the controlling device 12 and the fans 131 to transmit a pulse width modulation (PWM) signal P generated by the controlling device 12 to the fans 131 so that rotating speeds of the fans 131 are changed according to the PWM signal P.

In general, the fan system has to provide the sufficient heat dissipating requirement for the customer system end $SB_1$ in any state. When one of the fans 131 of the fan system is damaged, the fan can be immediately replaced in a hot-swap manner through the hot-swap element 111 so that the heat dissipating requirement of the customer system end $SB_1$ is maintained. However, the hot-swap elements 111 and 112 correspondingly connected to the main power $MP_1$ and the sub-power $SP_1$ of the customer system end $SB_1$ are powered on independently. When the user improperly swaps the fan, the pins 113 of the hot-swap controlling device 11 are easy to be bent, and the problem of the poor contact may rise due to the reduced terminal with the connector $C_1$.

In addition, the motor (not shown) of the fan 131 is the dynamic inductive load, and a high start current is required to start the fan 131 from the stationary state to the stable state. At the moment when the fan system is being started, an inrush current, a spike voltage or a spike noise may be generated between the fan system and the connector $C_1$ of the customer system end $SB_1$, or even a spark phenomenon (i.e., an electric arc) is generated, thereby damaging the customer system end $SB_1$ or the fan system.

In addition, the pins 113 of the hot-swap controlling device 11 are now made into a floating connector, as shown in FIG. 2, or a floating board (not shown) to ensure the pins 113 to contact the connector $C_1$ instantaneously. However, this method still cannot effectively and completely suppress the generation of the spike noise on the pins 113. In addition, when the hot-swap is being performed, the positive or negative spike noise generated by the hot-swap elements 111 tends to damage the small-signal electronic element (not shown) of the fan system through the grounding circuit of the main power $MP_1$ and the pins 113. Thus, the isolating circuits 132 are usually provided for the purpose of protection. In addition, if the hot-swap elements 111 are frequently used, the terminals of the pins 113 tend to have the poor contact due to the oxidation, and the lifetime of each of the hot-swap elements 111 tends to be shortened so that the quality of the fan system 1 is deteriorated.

In addition, the functions of the customer system end $SB_1$ becomes more complicated, the functional requirements on the fan system 1 are getting higher and higher. However, the first driving signal S01 and the second driving signal S02 are simultaneously inputted and then the fans 131 are simultaneously started in the conventional fan system 1, and the starting method of the fan system 1 cannot be changed according to different requirements and different occasions at the customer system end $SB_1$.

Therefore, it is an important subject to provide a fan system and a starting method thereof, wherein a customer system end and the fan system can be simultaneously protected and fans may be synchronously or started in sequence according to the requirement at the customer system end.

SUMMARY OF THE INVENTION

In view of the foregoing, the invention is to provide a fan system and a starting method thereof, wherein a customer system end and the fan system can be simultaneously protected and fans may be synchronously or started in sequence according to the requirement at the customer system end.

To achieve the above, the invention discloses a fan system including a connecting device, a controlling device and a fan device. The connecting device receives at least one driving signal and a start signal. The controlling device is electrically connected to the connecting device, generates a first enabling signal according to the start signal and thus synchronously outputs the first enabling signal and the driving signal. The fan device is electrically connected to the controlling device and receives the first enabling signal to control the driving signal to be transmitted synchronously.

To achieve the above, the invention also discloses a starting method for a fan system, which has a plurality of fans. The starting method includes the steps of receiving at least one driving signal and a start signal, generating a first enabling signal according to the start signal, and transmitting the driving signal to the fans and driving the fans synchronously according to the first enabling signal.

In addition, the invention further discloses a fan system including a connecting device, a controlling device and a fan device. The connecting device receiving at least one driving signal and a start signal. The controlling device electrically connected to the connecting device generates a plurality of first enabling signals according to the start signal and outputs the first enabling signals in sequence and the driving signals. The fan device is electrically connected to the controlling device and controls the driving signals to be transmitted in sequence according to the first enabling signals.

In addition, the invention further discloses a starting method for a fan system having a plurality of fans. The starting method includes the steps of receiving at least one driving signal and a start signal, generating a plurality of first enabling signals in sequence according to the start signal, and transmitting the driving signals to the fans in sequence and driving the fans according to the first enabling signals in sequence.

As mentioned above, the fan system and the starting method thereof according to the invention include the following features. The start controlling unit synchronously outputs the first enabling signal or outputs the first enabling signal in sequence according to the start signal, and the fan device in sequence or synchronously outputs the driving signal to synchronously start the fans or start the fans in sequence according to the first enabling signal. Consequently, the start controlling unit can function to turn on or off the overall fan device, and can synchronously start the fans or start the fans in sequence. In addition, it is possible to ensure that no electric arc is generated at the contacts between the pins and the connector, and it is also possible to prevent the positive or negative spike noise from being transmitted to the controlling device and the fan device through the pins. In addition, the isolation protecting unit can effective suppress the spike voltage or inrush current generated by the main power circuit at the fan device end when the controlling device transmits the driving signals to the fan device, and suppress the spike noise generated at the instant when the fan device is started.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
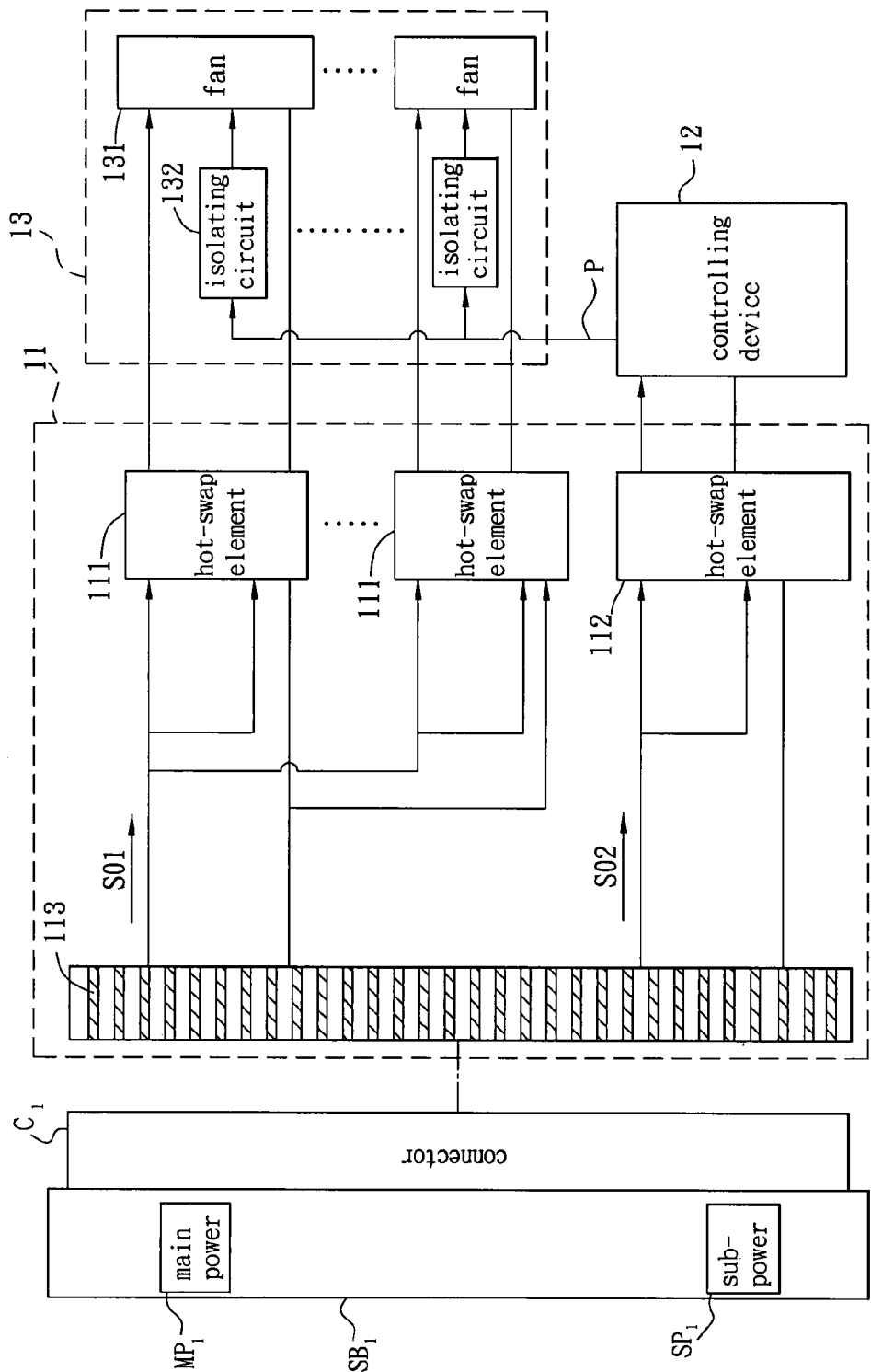
FIG. 1 is a schematic illustration showing a conventional fan system.
Figure 2:
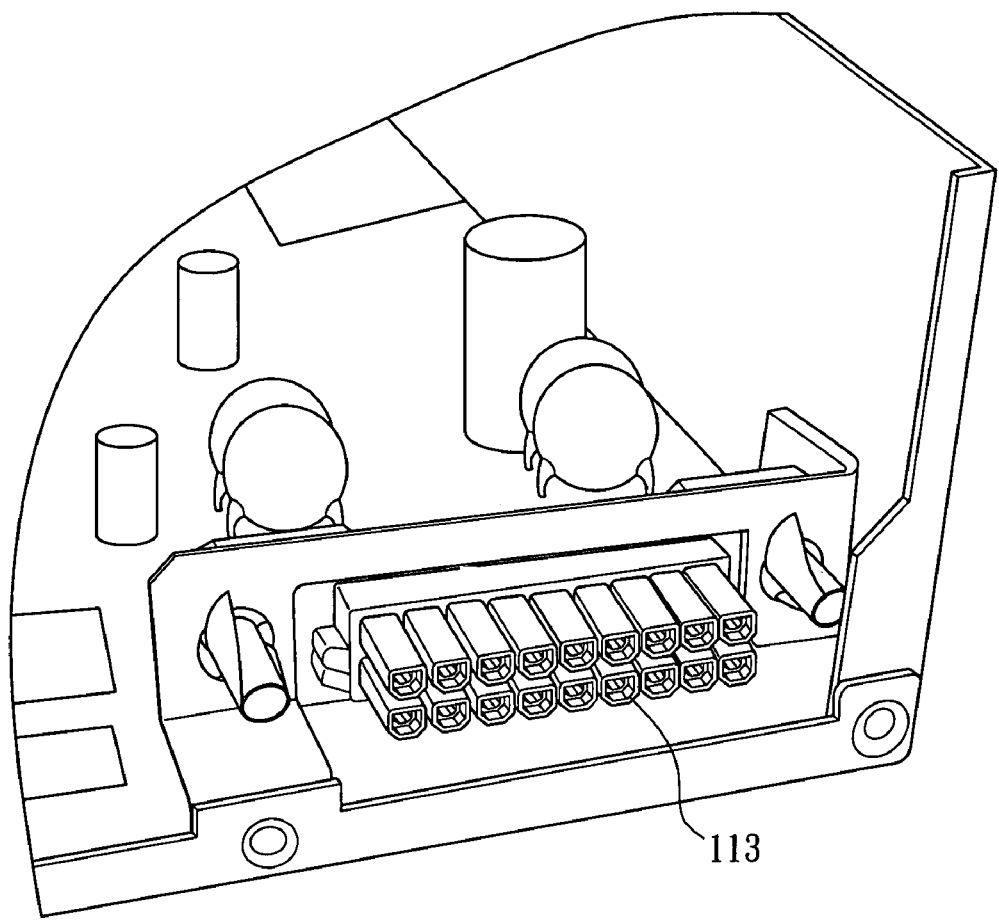
FIG. 2 shows structures of pins in a hot-swap controlling device of the conventional fan system.
Figure 3:
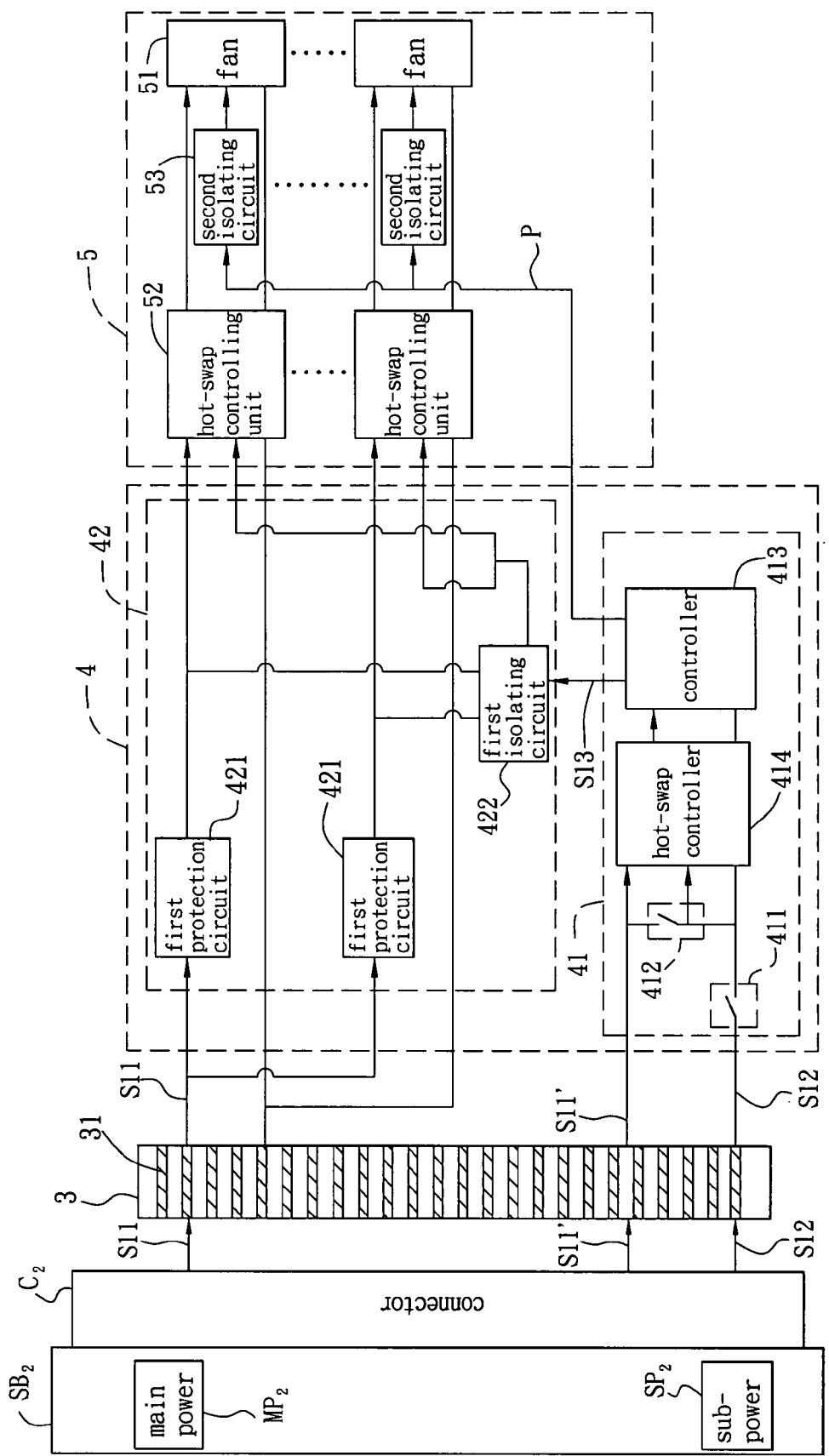
FIG. 3 is a schematic illustration showing a fan system according to a first embodiment of the invention.

Referring to FIG. 3, a fan system according to a first embodiment of the invention includes a connecting device 3, a controlling device 4 and a fan device 5. In practice, the fan system of this embodiment is electrically connected to a connector $C_2$ of a customer system end $SB_2$, the customer system end $SB_2$ provides at least one of driving signals S11 and S11' and a start signal S12 to the fan system through the connector $C_2$, the driving signal S11 is generated by main power $MP_2$ of the customer system end $SB_2$, and the driving signal S11' is generated by sub-power $SP_2$. Herein, the customer system end $SB_2$ provides the plurality of driving signals S11 and S11'. In addition, the driving signals S11 and S11' and the start signal S12 in this embodiment have different voltage levels, and the start signal S12 is implemented as a low potential (voltage) signal or a ground signal. Herein, the start signal S12 is a ground signal.

The connecting device 3 of this embodiment has a plurality of pins 31, which is to be electrically connected to the connector $C_2$ of the customer system end $SB_2$ and thus simultaneously receives and transmits the driving signals S11 and S11' and the start signal S12.

The controlling device 4 is electrically connected to the pins 31 of the connecting device 3, and has a start controlling unit 41 and an isolation protecting unit 42 electrically connected to each other.

The start controlling unit 41 has a first switch element 411, a second switch element 412 and a controller 413. The first switch element 411 is electrically connected to the connecting device 3, the second switch element 412 is electrically connected to and between the first switch element 411 and the controller 413, and the controller 413 is electrically connected to the fan device 5 and generates a PWM signal P. In addition, the start controlling unit 41 of this embodiment further has a hot-swap controller 414, which is electrically connected to and between the second switch element 412 and the controller 413, receives the driving signal S11' and the start signal S12 when the first switch element 411 and the second switch element 412 simultaneously turn on, and transmits the driving signal S11' to the controller 413 according to the start signal S12 to start the controller 413. The controller 413 generates a first enabling signal S13 according to the driving signal S11' and the start signal S12 to control the controlling device 4 to start and synchronously output the first enabling signal S13 and the driving signal S11. In practice, the controller 413 of this embodiment is a microprocessor, a digital signal processor or a controlling chip. In addition, the hot-swap controller 414 may be replaced with a new controller (not shown) in a hot-swap manner.

In this embodiment, the isolation protecting unit 42 has a plurality of first protection circuits 421 and a first isolating circuit 422. The first protection circuits 421 are electrically connected to the pins 31 of the connecting device 3 and the fan device 5, respectively, and receive the driving signals S11 from the connecting device 3. The first protection circuits 421 ensure that the driving signals S11 may be stably transmitted to the fan device 5 and prevent a reverse current from being generated. The first isolating circuit 422 is electrically connected to and between the controller 413, the first protection circuits 421 and the fan device 5. The first isolating circuit 422 isolates the grounds of the driving signals S11 from the ground of the first enabling signal S13 to prevent the positive or negative spike noise from damaging the post-stage fan device 5 through the ground of the main power $MP_2$. In addition, the first isolating circuit 422 further transmits the first enabling signal S13 to the fan device 5.

In this embodiment, the fan device 5 has a plurality of fans 51 and a plurality of hot-swap controlling units 52. The hot-swap controlling units 52 are electrically connected to the isolation protecting unit 42 of the controlling device 4 and the fans 51, respectively, to receive the first enabling signal S13 and synchronously transmit the driving signal S11 and thus to start the fans 51 according to the first enabling signal S13. In addition, new fans (not shown) may be changed or swapped in the hot-swap manner using the hot-swap controlling units 52.

After the fans 51 start, the controller 413 can control rotating speeds of the fans 51 according to the PWM signal P. In addition, the fan device 5 of this embodiment further has a plurality of second isolating circuits 53. In practice, the number of the second isolating circuits 53 corresponds to that of the fans 51, and the second isolating circuits 53 are electrically connected to and between the controller 413 and the fans 51. The second isolating circuits 53 isolate the grounds of the driving signals S11 from the ground of the controller 413, and can stably transmit the PWM signal P from the controller 413 to the fans 51.

As shown in FIG. 3, the operating method of the synchronous start of the fan system of this embodiment will be described in the following. After the fan system is electrically connected to the customer system end $SB_2$, the pins 31 of the connecting device 3 simultaneously receive the driving signals S11 and S11' and the start signal S12 through the connector $C_2$. At this time, the start controlling unit 41 of the controlling device 4 starts the controller 413 according to the start signal S12 and the driving signal S11', enables the controller 413 to generate the first enabling signal S13 and controls the controlling device 4 to synchronously output the first enabling signal S13 and the driving signal S11. The isolation protecting unit 42 isolates the driving signal S11 from the first enabling signal S13, and ensures that the driving signal S11 and the first enabling signal S13 may be stably transmitted to the fan device 5. The hot-swap controlling unit 52 of the fan device 5 synchronously transmits the driving signal S11 to the fans 51 and thus synchronously starts the fans 51 according to the first enabling signal S13. In addition, the controller 413 controls the rotating speeds of the fans 51 according to the PWM signal P.

The fans 51 will not be immediately started after the driving signals S11 and S11' and the start signal S12 are transmitted to the controlling device 4. Instead, the driving signals S11 and S11' are synchronously transmitted and the fans 51 are synchronously started after the start controlling unit 41 generates the first enabling signal S13 according to the start signal S12. According to this method, the start controlling unit 41 can function to turn on or off the fan device 5; the controlling device 4 may also have the effect of synchronously starting the fans 51 of the fan device 5. Of course, it is also possible to ensure that no electric arc and positive or negative spike noise is generated when the pins 31 receive the driving signals S11 and S11'. In addition, the isolation protecting unit 42 can effectively suppress the spike voltage or the inrush current generated by the main power $MP_2$ at the end of the fan device 5 when the controlling device 4 transmits the driving signals S11 to the fan device 5, and can also suppress the spike noise generated at the instant when the fan device 5 is started in conjunction with the hot-swap controlling units 52.

Figure 4:
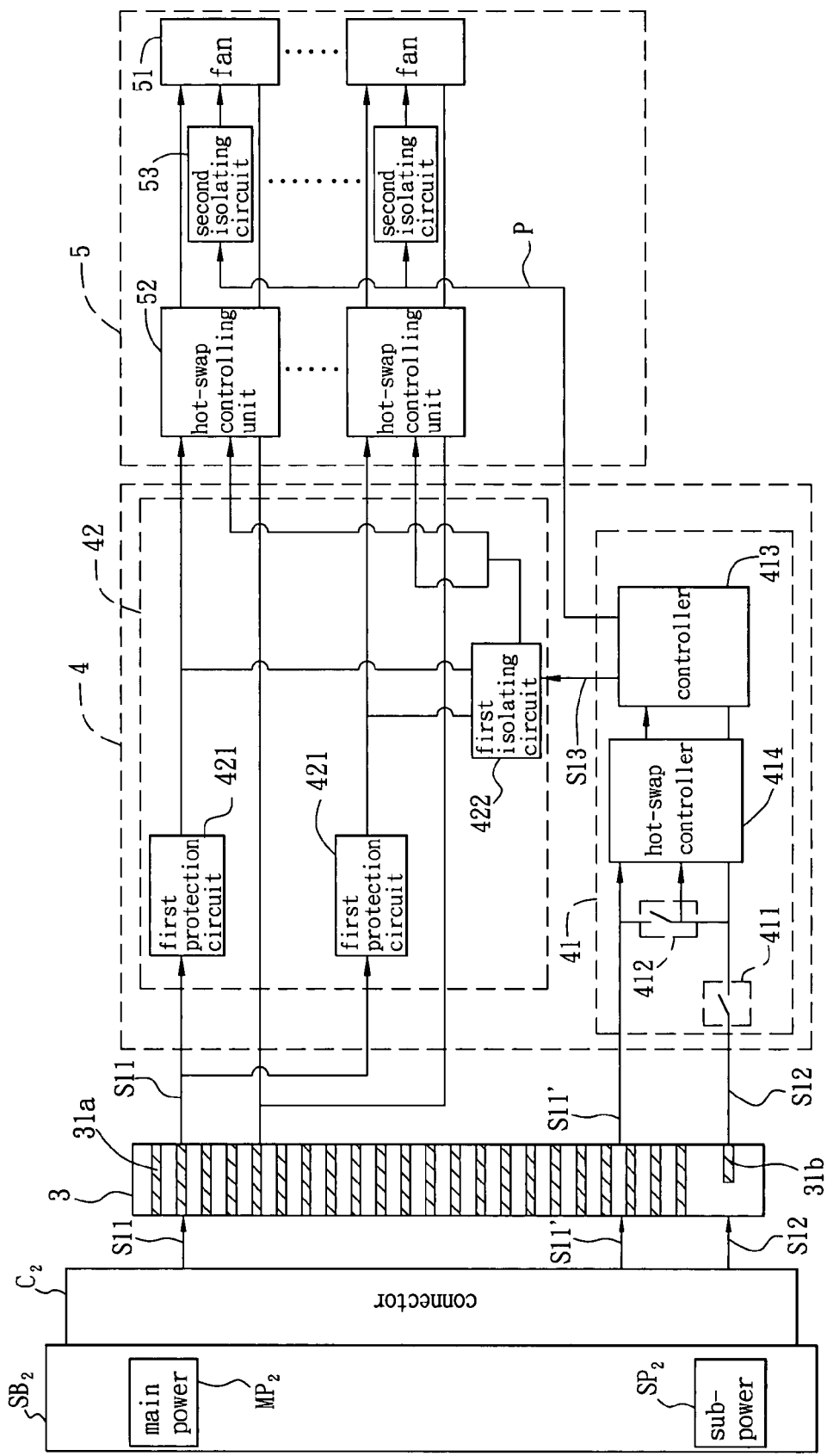
FIG. 4 is a schematic illustration showing the fan system according to the first embodiment of the invention, wherein the connecting device has a first pin and a second pin.

In addition, as shown in FIG. 4, the pins 31 of the connecting device 3 of this embodiment may be composed of a plurality of first pins 31a and a second pin 31b, and are electrically connected to the connector $C_2$ of the customer system end $SB_2$. For example, the first pins 31a and the second pin 31b are inserted into the connector $C_2$ and are thus electrically connected to a plurality of pins (not shown) of the connector $C_2$ so that the driving signals S11 and S11' and the start signal S12 can be received. In addition, the first pins 31a have the same length, which is longer than a length of the second pin 31b. So, when the fan system is electrically connected to the customer system end $SB_2$, the first pins 31a of the connecting device 3 are first in contact with the connector $C_2$. At this time, the controlling device 4 simultaneously receives the driving signals S11 and S11' through the first pins 31a. Next, the second pin 31b is again in contact with the connector $C_2$ to receive the start signal S12. That is, the driving signals S11 and S11' and the start signal S12 are inputted to the fan system in sequence at different instants which an interval time exists. In this embodiment, the second pin 31b cooperates with the start controlling unit 41 to enhance the function of turning on or off the fan device 5 in the above-mentioned embodiment, and further ensures that no electric arc and positive or negative spike noise is generated when the first pins 31a receive the driving signals S11 and S11'.

Figure 5:
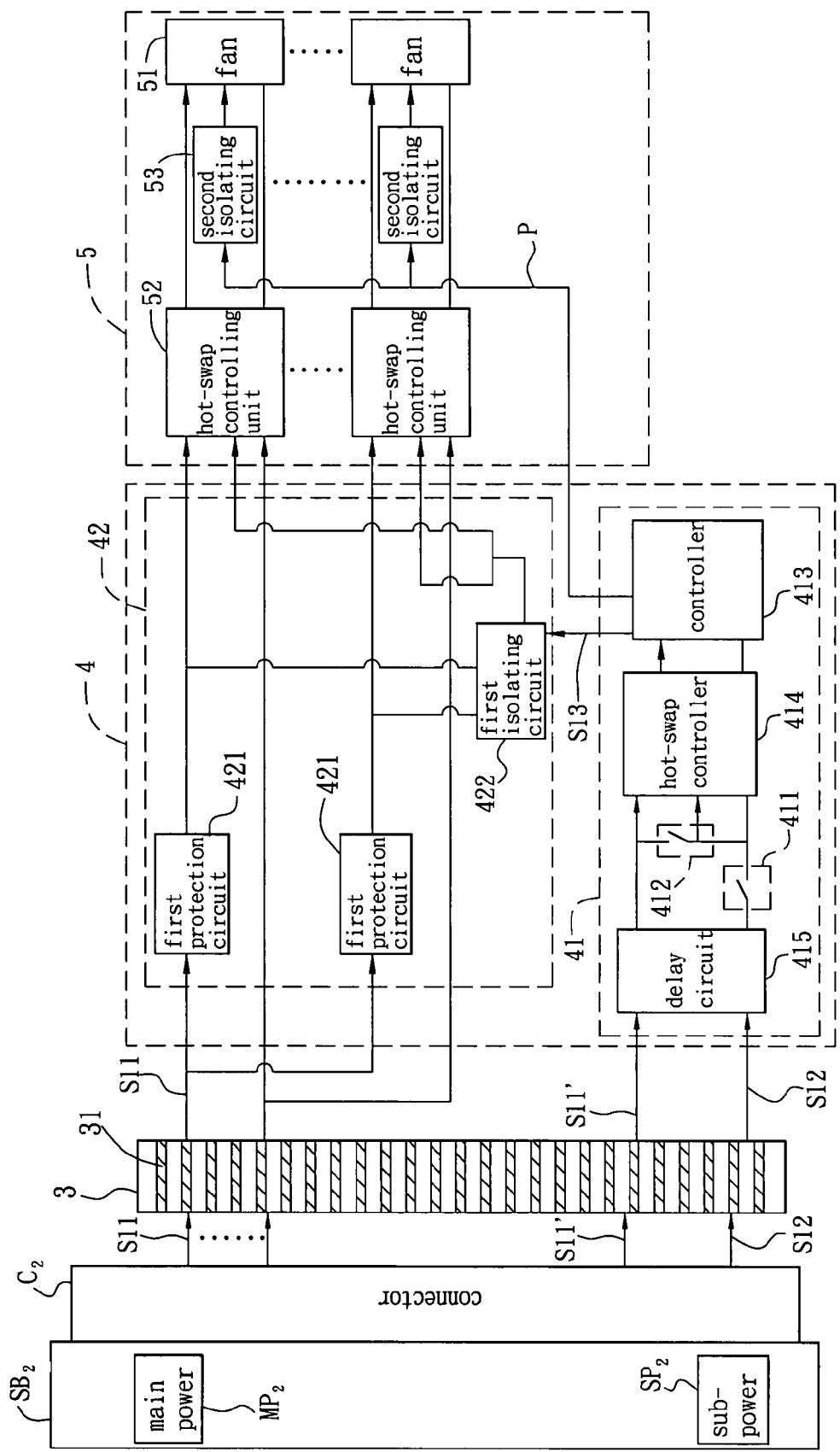
FIG. 5 is a schematic illustration showing the fan system according to the first embodiment of the invention, wherein the controlling device has a delay circuit.

Another aspect of enhancing the effect of turning on or off the overall fan device 5 will be described with reference to FIG. 5, wherein the start controlling unit 41 of this embodiment further has a delay circuit 415 electrically connected to the pins 31 of the connecting device 3 and the first switch element 411. In addition, the delay circuit 415 may be implemented as an RC delay circuit having a resistor and a capacitor (not shown) electrically connected to each other, and the resistor and the capacitor cooperate with each other to generate a delay time. In this embodiment, the start signal S12 and the driving signals S11 and S11' cannot be transmitted and the controller 413 cannot be started through the first switch element 411 and the second switch element 412 until the delay circuit 415 has received the start signal S12 and the delay time has elapsed. In this manner, the effect of turning on or off the fan device 5 can be achieved using the delay circuit 415 in conjunction with the controller 413.

Figure 6:
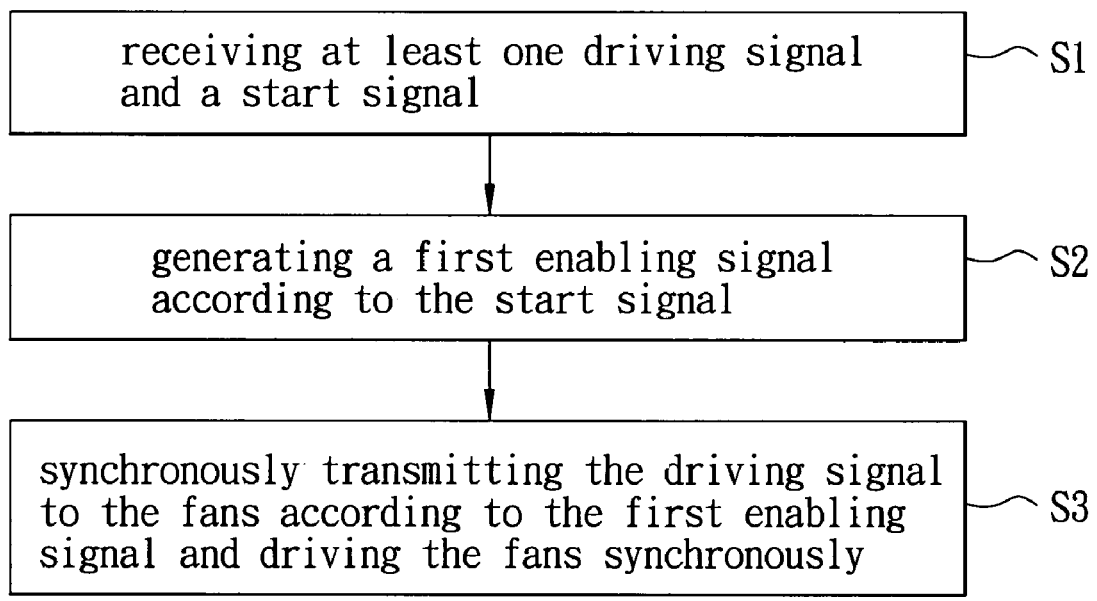
FIG. 6 is a flow chart showing a starting method for the fan system according to the first embodiment of the invention.

The starting method for the fan system according to the first embodiment will be described in the following. As shown in FIG. 6, the starting method for the fan system according to the first embodiment of the invention may be applied to the fan system of the first embodiment (see FIG. 3).

The starting method includes steps S1 to S3.

In step S1, at least one of driving signals S11 and S11' and a start signal S12 are received. The start signal S12 of this embodiment is a low potential (voltage) signal or a ground signal.

In step S2, a first enabling signal S13 is generated by the controlling device 4 of the first embodiment according to the start signal S12.

In step S3, the driving signal S11 is synchronously transmitted, by the controlling device 4, to the fans 51 according to the first enabling signal S13, and the fans 51 are synchronously driven.

Figure 7:
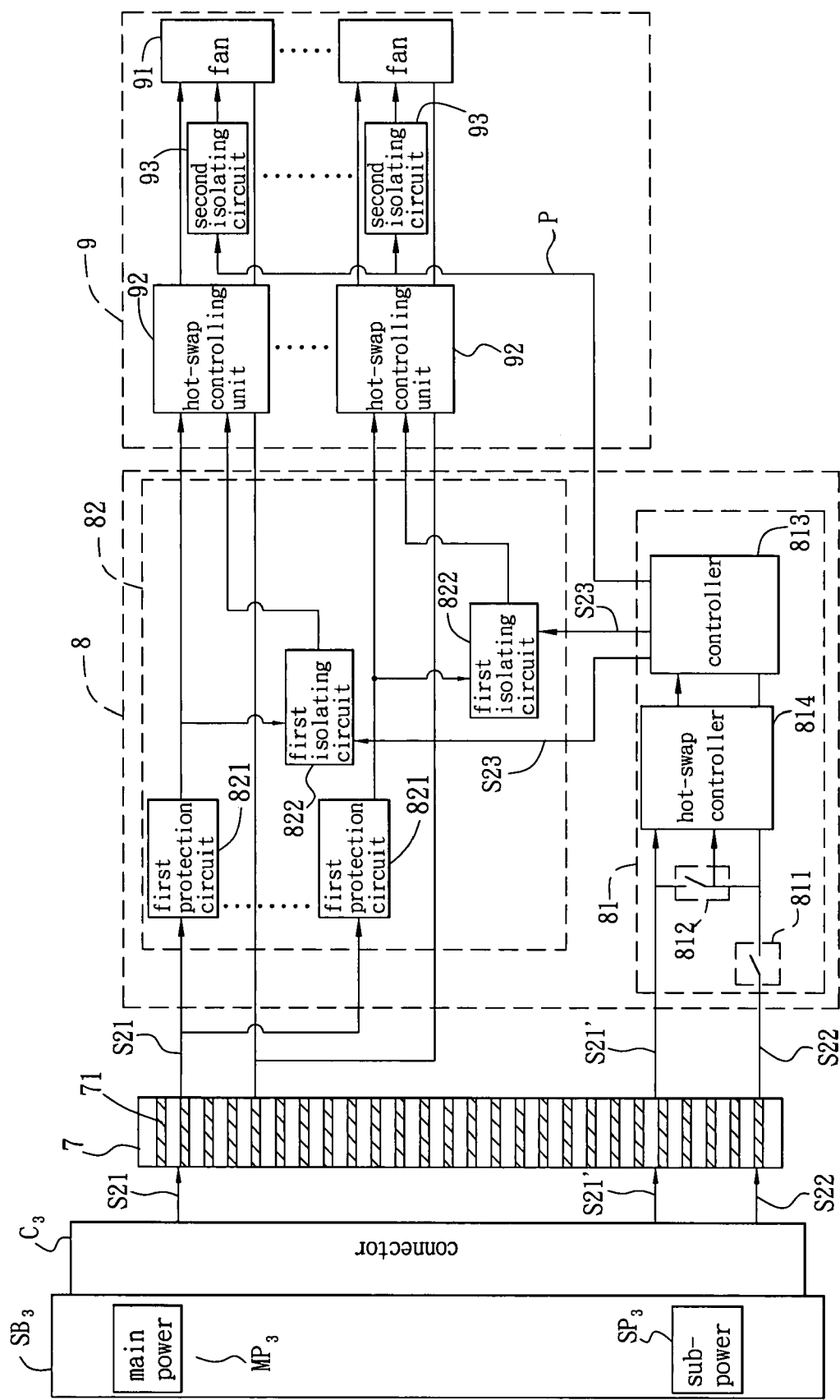
FIG. 7 is a schematic illustration showing a fan system according to a second embodiment of the invention.

Referring to FIG. 7, a fan system according to a second embodiment of the invention includes a connecting device 7, a controlling device 8 and a fan device 9. The fan system is electrically connected to a connector $C_3$ of a customer system end $SB_3$. The connection between the fan system and the customer system end $SB_3$ and the structure, features and effects of the customer system end $SB_3$ in this embodiment are the same as the connection between the fan system and the customer system end $SB_2$ and the structure, features and effects of the customer system end $SB_2$ in the first embodiment (see FIG. 3), so detailed descriptions thereof will be omitted. So, the features and effects of the at least one of driving signals S21 and S21' and a start signal S22 supplied by the customer system end $SB_3$ in this embodiment are the same as those of the at least one of the driving signals S11 and S11' and the start signal S12 in the first embodiment, so detailed descriptions thereof will be omitted.

The connecting device 7 of this embodiment has a plurality of pins 71, and is electrically connected to the customer system end $SB_3$ to receive the driving signals S21 and S21' and the start signal S22.

As shown in FIG. 7, the controlling device 8 of this embodiment is electrically connected to the pins 71 of the connecting device 7 and has a start controlling unit 81 and an isolation protecting unit 82, and can receive the driving signals S21 and S21' and the start signal S22 through the pins 71.

The start controlling unit 81 has a first switch element 811, a second switch element 812 and a controller 813. The first switch element 811 is electrically connected to the connecting device 7, and the second switch element 812 is electrically connected to and between the first switch element 811 and the controller 813. In addition, the start controlling unit 81 further has a hot-swap controller 814 electrically connected to the second switch element 812 and the controller 813. The hot-swap controller 814 receives the driving signal S21' and the start signal S22, and starts the controller 813 when the first switch element 811 and the second switch element 812 turn on. The controller 813 generates a PWM signal P after being started, and generates a plurality of first enabling signals S23 in sequence according to the start signal S22. According to the hot-swap controller 814 of this embodiment, a new controller (not shown) may be changed or swapped by using a hot-swap manner.

The isolation protecting unit 82 has a plurality of first protection circuits 821 and a plurality of first isolating circuits 822. The first protection circuits 821 are electrically connected to the pins 71 and the fan device 9, respectively, and can ensure that the driving signals S21 and S21' be stably transmitted to the fan device 9 and prevent the reverse current from being generated. The first isolating circuits 822 are electrically connected to and between the controller 813, the first protection circuits 821 and the fan device 9. The first isolating circuits 822 isolate the grounds of the first enabling signals S23 from the grounds of the driving signals S21 and S21' and transmit the first enabling signals S23 to the fan device 9 in sequence.

In this embodiment, the fan device 9 has a plurality of fans 91 and a plurality of hot-swap controlling units 92 disposed between the isolation protecting unit 82 and the fans 91. The hot-swap controlling units 92 receive the first enabling signals S23 in sequence and transmit the driving signals S21 and S21' to the fans 91 in sequence and start the fans 91 in sequence according to the first enabling signals S23. In addition, the fan device 9 further has a plurality of second isolating circuits 93 electrically connected to and between the controller 813 and the fans 91. The features, operations and effects of the fans 91, the hot-swap controlling units 92 and the second isolating circuits 93 of the fan device 9 according to this embodiment are the same as those of the fans 51, the hot-swap controlling units 52 and the second isolating circuits 53 of the fan device 5 according to the first embodiment, so detailed descriptions thereof will be omitted.

As shown in FIG. 7, the method of starting the fans of the fan system in sequence of this embodiment will be described in the following. After the fan system has been connected to a customer system end, the pins 71 simultaneously receive the driving signals S21 and S21' and the start signal S22. At this time, the start controlling unit 81 enables the controller 813 to generate in sequence and output the first enabling signals S23 according to the start signal S22, and the isolation protecting unit 82 isolates the driving signal S21 from the first enabling signal S23 to stably output the driving signal S21 and to output the first enabling signals S23 to the fan device 9 in sequence. The hot-swap controlling units 92 of the fan device 9 transmit the driving signal S21 to the fans 91 in sequence and thus start the fans 91 according to the first enabling signal S23 in sequence.

It is to be specified that the controller 813 is implemented as a microprocessor, a digital signal processor or a controlling chip. So, the controller 813 may have a delay time configured before the first enabling signals S23 delivery according to the software or hardware design, and the sequential transmitting and starting effects may be thus achieved.

The fans 91 will not be immediately started when the driving signals S21 and S21' and the start signal S22 are transmitted to the controlling device g. Instead, the fan device 9 cannot transmit the driving signals S21 and S21' to the fans 91 in sequence and start the fans according to the first enabling signals S23 in sequence until the start controlling unit 81 generates the first enabling signals S23 according to the start signal S22 in sequence. According to this method, the start controlling unit 81 can turn on or off the function of the overall fan device 9, and may further enable the controlling device 8 to have the effect of starting the fan device 9 in sequence. Of course, the effects of the isolation protecting unit 82, the pins 71 and the hot-swap controlling units 92 of this fan system according to this embodiment are the same as those of the isolation protecting unit 42, the pins 31 and the hot-swap controlling units 52 of the fan system according to the first embodiment, so detailed descriptions thereof will be omitted.

If the effect of turning on or off the fan device 9 is to be enhanced in this embodiment, the pins 71 may be composed of a plurality of first pins and a second pin, and the length of each of the first pins is longer than that of the second pin (not shown). Alternatively, a delay circuit (not shown) may be electrically connected to and between the connecting device 7 and the first switch element 811 in this embodiment, wherein the first pins, the second pin and the delay circuit may be implemented as those shown in FIG. 4 or 5, so detailed descriptions thereof will be omitted.

Figure 8:
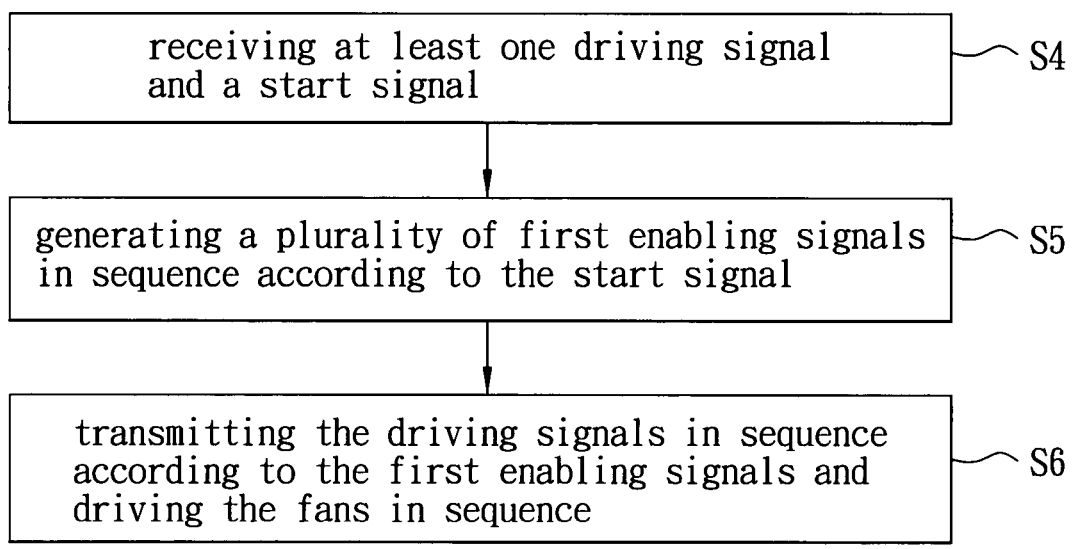
FIG. 8 is a flow chart showing a starting method for the fan system according to the second embodiment of the invention.

As shown in FIG. 8, the starting method for the fan system according to the second embodiment of the invention will be described in the following with reference to the example of the fan system (see FIG. 7).

The starting method of the fan system in this example includes steps S4 to S6.

In step S4, at least one of driving signals S21 and S21' and a start signal S22 are received.

In step S5, first enabling signals S23 are generated according to the start signal S22 in sequence. In this embodiment, the start signal S22 is a low potential (voltage) signal or a ground signal, and the first enabling signals S23 are generated by the controlling device 8 according to the start signal S22 in sequence.

In step S6, the driving signals S21 and S21' are transmitted according to the first enabling signals S23 in sequence and the fans are driven in sequence. The driving signal S21 is transmitted by the controlling device 8 according to the first enabling signals S23.

In summary, the fan system and the starting method thereof according to the invention have the following features. The start controlling unit synchronously outputs the first enabling signal or outputs the first enabling signal in sequence according to the start signal, and the fan device synchronously outputs the driving signal or outputs the driving signal in sequence to synchronously start the fans or start the fans in sequence according to the first enabling signal. Consequently, the start controlling unit can function to turn on or off the overall fan device, and can synchronously start the fans or starts the fans in sequence. In addition, it is possible to ensure that no electric arc is generated at the contacts between the pins and the connector, and it is also possible to prevent the positive or negative spike noise from being transmitted to the controlling device and the fan device through the pins. In addition, the isolation protecting unit can effective suppress the spike voltage or inrush current generated by the main power circuit at the fan device end when the controlling device transmits the driving signals to the fan device, and suppress the spike noise generated at the instant when the fan device is started.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A fan system comprising:
   a connecting device for receiving at least one driving signal and a start signal;
   a controlling device electrically connected to the connecting device, generating a first enabling signal according to the start signal and thus synchronously outputting the first enabling signal and the driving signal; and
   a fan device electrically connected to the controlling device and receiving the first enabling signal to control the driving signal to be transmitted synchronously,
   wherein the controlling device further comprises an isolation protecting unit comprising:
   a plurality of first protection circuits electrically connected to the connecting device and the fan device; and
   a first isolating circuit electrically connected to the first protection circuits and the controller to isolate the driving signal from the first enabling signal, and
   wherein the controlling device includes a delay circuit electrically connected to the connecting device, receiving the start signal and then transmitting the start signal after a delay time.

2. The fan system according to claim 1, wherein the fan device comprises at least one fan, and a plurality of hot-swap controlling units electrically connected to the controlling device and the fan, respectively, to synchronously transmit the driving signal to the fan according to the first enabling signal.

3. The fan system according to claim 1, wherein the controlling device comprises a start controlling unit, which comprises:
   a first switch element electrically connected to the connecting device and receiving the start signal;
   a second switch element electrically connected to the first switch element; and
   a controller, generating a pulse width modulation (PWM) signal to control rotation speeds of fans of the fan system, electrically connected to the second switch element, receiving the start signal through the first switch element and the second switch element, and generating the first enabling signal according to the start signal.

4. The fan system according to claim 3, wherein the start controlling unit further comprises:
   a hot-swap controller electrically connected to the second switch element and the controller, receiving the start signal and transmitting the driving signal to the controller according to the start signal.

5. The system according to claim 3, wherein the controller is a microprocessor, a digital signal processor or a controlling chip.

6. The fan system according to claim 3, wherein the fan device further comprises at least one fan, and a plurality of second isolating circuits electrically connected to the controller and the fan for transmitting the PWM signal to the fan.

7. The system according to claim 1, wherein the delay circuit has a resistor and a capacitor electrically connected with each other.

8. The fan system according to claim 1, wherein the connecting device comprises a plurality of pins comprising a plurality of first pins for receiving the driving signal, and a second pin for receiving the start signal, wherein a length of each of the first pins is longer than that of the second pin.

9. A starting method for a fan system having a plurality of fans, comprising the steps of:
   receiving at least one driving signal and a start signal;
   generating a plurality of first enabling signals according to the start signal;
   outputting the first enabling signals and the driving signals in sequence; and
   transmitting the driving signals to the fans in sequence and driving the fans according to the first enabling signals in sequence,
   wherein the driving signal and the start signal have different voltage levels, and the start signal is a low potential signal or a ground signal.

10. The method according to claim 9, wherein a controlling device of the fan system generates the first enabling signal according to the start signal and a fan device of the fan system transmits the driving signal according to the first enabling signal.

11. A fan system comprising:
   a connecting device for receiving at least one driving signal and a start signal;
   a controlling device electrically connected to the connecting device, generating a plurality of first enabling signals according to the start signal and outputting the first enabling signals and the driving signals in sequence; and
   a fan device electrically connected to the controlling device and controlling the driving signals to be transmitted in sequence according to the first enabling signals,
   wherein the controlling device includes a delay circuit electrically connected to the connecting device, receiving the start signal and then transmitting the start signal after a delay time.

12. The fan system according to claim 11, wherein the fan device comprises at least one fan, and a plurality of hot-swap controlling units electrically connected to the controlling device and the fan, respectively, to transmit the driving signal to the fan according to the first enabling signals.

13. The fan system according to claim 11, wherein the controlling device comprises a start controlling unit comprising:

a first switch element electrically connected to the connecting device and receiving the start signal;

a second switch element electrically connected to the first switch element; and a controller generating a pulse width modulation (PWM) signal to control rotation speeds of the fans, electrically connected to the second switch element, receiving the start signal through the first switch element and the second switch element, and generating the first enabling signals according to the start signal.

14. The fan system according to claim 13, wherein the start controlling unit further comprises:

a hot-swap controller electrically connected to the second switch element and the controller, receiving the start signal and transmitting the driving signal to the controller according to the start signal.

15. The fan system according to claim 13, wherein the controlling device further comprises an isolation protecting unit comprising:

a plurality of first protection circuits electrically connected to the connecting device and the fan device; and a plurality of first isolating circuits electrically connected to the first protection circuits and the controller to isolate the driving signal from the first enabling signals.

16. The fan system according to claim 13, wherein the fan device further comprises at least one fan, and a plurality of second isolating circuits electrically connected to the controller and the fans for transmitting the PWM signal to the fans.

17. The fan system according to claim 11, wherein the connecting device comprises a plurality of pins comprising a plurality of first pins for receiving the driving signal, and a second pin for receiving the start signal, wherein a length of each of the first pins is longer than that of the second pin.

18. A fan system comprising:

a connecting device for receiving at least one driving signal and a start signal;

a controlling device electrically connected to the connecting device, generating a first enabling signal according to the start signal and thus synchronously outputting the first enabling signal and the driving signal; and a fan device electrically connected to the controlling device and receiving the first enabling signal to control the driving signal to be transmitted synchronously, wherein the controlling device further comprises an isolation protecting unit comprising:

a plurality of first protection circuits electrically connected to the connecting device and the fan device; and a first isolating circuit electrically connected to the first protection circuits and the controller to isolate the driving signal from the first enabling signal so as to prevent positive or negative spike noise from damaging the fan device through a ground of a main power, and wherein the controlling device includes a delay circuit electrically connected to the connecting device, receiving the start signal and then transmitting the start signal after a delay time.

* * * * *